United States Patent
Sawai et al.

(10) Patent No.: US 11,258,911 B2
(45) Date of Patent: Feb. 22, 2022

(54) IMAGE PROCESSING DEVICE AND FOLDING DEVICE

(71) Applicant: FUJIFILM BUSINESS INNOVATION CORP., Tokyo (JP)

(72) Inventors: Kenji Sawai, Kanagawa (JP); Shogo Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 15 days.

(21) Appl. No.: 16/983,823

(22) Filed: Aug. 3, 2020

(65) Prior Publication Data

US 2021/0289095 A1 Sep. 16, 2021

(30) Foreign Application Priority Data

Mar. 16, 2020 (JP) .............................. JP2020-045598

(51) Int. Cl.
*H04N 1/04* (2006.01)
*H04N 1/00* (2006.01)
*H04N 1/203* (2006.01)

(52) U.S. Cl.
CPC ..... *H04N 1/00718* (2013.01); *H04N 1/00639* (2013.01); *H04N 1/00713* (2013.01); *H04N 1/00748* (2013.01); *H04N 1/00774* (2013.01); *H04N 1/2032* (2013.01); *B65H 2511/522* (2013.01)

(58) Field of Classification Search
CPC ........... H04N 1/00639; H04N 1/00718; H04N 1/00713; H04N 1/00748; H04N 1/00774; H04N 1/2032; H04N 1/00082–00087; B65H 2511/522
USPC ....................................... 358/1.14, 406, 488
See application file for complete search history.

(56) References Cited

U.S. PATENT DOCUMENTS

| 8,226,076 | B2 * | 7/2012 | Shirakuma ............. | B65H 31/34 |
|---|---|---|---|---|
| | | | | 270/32 |
| 2005/0090373 | A1 | 4/2005 | Schmid et al. | |
| 2019/0070885 | A1 * | 3/2019 | Tanigawa ............... | B65H 37/06 |
| 2021/0105377 | A1 * | 4/2021 | Sawai ................ | H04N 1/00737 |
| 2021/0289077 | A1 * | 9/2021 | Tanaka ............... | H04N 1/00639 |
| 2021/0289094 | A1 * | 9/2021 | Sawai ................ | H04N 1/00702 |

FOREIGN PATENT DOCUMENTS

JP 2005-132630 A 5/2005

\* cited by examiner

*Primary Examiner* — Cheukfan Lee
(74) *Attorney, Agent, or Firm* — Oliff PLC

(57) ABSTRACT

An image processing device includes a processor configured to: obtain image information obtained by reading a sheet that is folded with an intention that a folding line is formed at a position apart from a sheet center position in a specific direction by a predetermined distance, using an image reading device in a state in which a short folded piece of the sheet faces a sensor surface; obtain positions of two edges that are opposite to each other across a folding back of the sheet in the image information; and detect a deviation amount of the folding line based on the positions of the two edges and the predetermined distance.

9 Claims, 5 Drawing Sheets

IMAGE PROCESSING DEVICE AND FOLDING DEVICE

CROSS-REFERENCE TO RELATED APPLICATIONS

This application is based on and claims priority under 35 USC 119 from Japanese Patent Application No. 2020-045598 filed Mar. 16, 2020.

BACKGROUND

1. Technical Field

The present disclosure relates to an image processing device and a folding device.

2. Related Art

Automatic folding devices (hereinafter, simply referred to as folding devices) perform a folding process for a sheet. Whether a position of a folding line of the folded sheet is deviated from a desired position is also verified. For example, the position of the folding line can be detected and confirmed by unfolding the folded sheet and reading the sheet with an image reading device.

JP-A-2005-132630 relates to detection of fold quality of a folded product. JP-A-2005-132630 describes that, before folding, a fold assist mark having a scale for detecting fold deviation amount is formed in a part where the fold of the folded product is to be formed, and accuracy of the fold in the finished folded product is evaluated based on the fold assist mark.

SUMMARY

By the way, when two edges opposite to each other across a folding back of a half-folded sheet do not overlap, a folding line of the sheet is deviated from a center position. If a distance between the two edges can be detected, a deviation amount from the center position of the folding line of the sheet can be known. The larger the distance between the two edges is, the larger the deviation amount of the folding line of the sheet from the central position is.

When the distance between the two edges is large, one side of the sheet is ready with an image reading device such that the two edges can be read while the sheet is being half-folded, so that the two edges appear in the read image information, and the deviation amount of the folding line can be obtained based on the distance between the edges. However, when the distance between the edges is small, the two edges do not appear individually in the image information, and the deviation amount of the folding line may not be obtained.

Aspects of certain non-limiting embodiments of the present disclosure relate to reading a sheet with an image reading device while the sheet is folded, to obtain a deviation amount of a folding line from read image information regardless of a magnitude of the deviation amount of the folding line of the sheet.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing device including a processor configured to: obtain image information obtained by reading a sheet that is folded with an intention that a folding line is formed at a position apart from a sheet center position in a specific direction by a predetermined distance, using an image reading device in a state in which a short folded piece of the sheet faces a sensor surface; obtain positions of two edges that are opposite to each other across a folding back of the sheet in the image information; and detect a deviation amount of the folding line based on the positions of the two edges and the predetermined distance.

BRIEF DESCRIPTION OF THE DRAWINGS

Exemplary embodiment(s) of the present disclosure will be described in detail based on the following figures, wherein.

DETAILED DESCRIPTION

Figure 1:
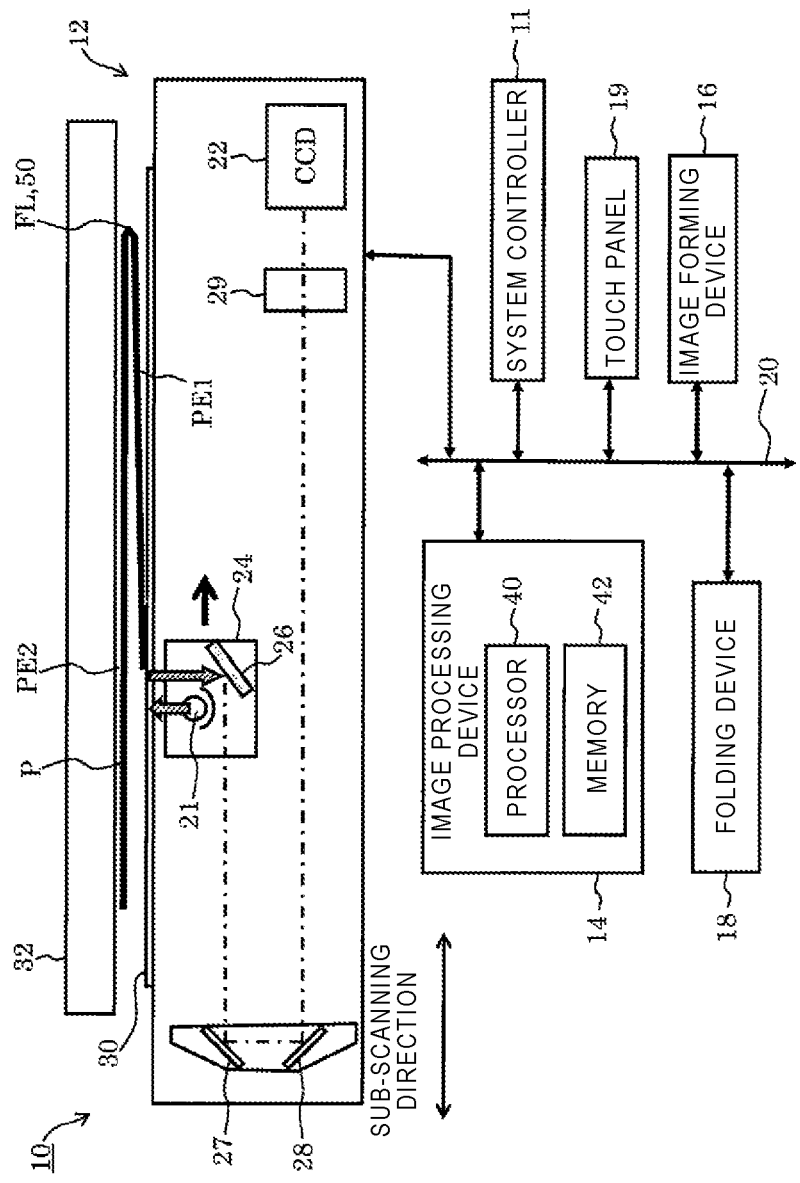
FIG. 1 is a block diagram showing a configuration of a system according to each exemplary embodiment of the present disclosure.

Hereinafter, each exemplary embodiment of the present disclosure will be described in detail with reference to the accompanying drawings. The configuration to be described below is merely an example for description, and may be appropriately changed in accordance with specifications of a device and the like. When the following description contains plural exemplary embodiments and plural modifications, it is assumed from the beginning that characteristic parts of the exemplary embodiments and the modifications may be used in combination as appropriate. In all the drawings, the same elements are denoted by the same reference numerals, and repetitive descriptions thereof will be omitted.

FIG. 1 is a block diagram showing a configuration of a system 10 according to each exemplary embodiment of the present disclosure. The system 10 includes a system controller 11, an image reading device 12, an image processing device 14, an image forming device 16, a folding device 18, and a touch panel 19, which are electrically connected to one another via a bus 20. The system 10 is installed in, for example, a printing company, an office, or the like. The system 10 is connected to a network such as a LAN. The system 10 provides a print function, a copy function, a sheet folding function, and the like by the system controller 11 receiving a job from the outside via the network or receiving an operator's instruction input through the touch panel 19. The system 10 has a function of detecting a deviation amount of a folding line of a sheet P folded by the folding device 18 and adjusting the folding device 18 based on the detected deviation amount.

The system controller 11 includes a processor and a memory which are not shown. The system controller 11 controls the entire system 10. The system controller 11 controls the image reading device 12, the image processing device 14, the image forming device 16, and the folding device 18 according to the job input from the outside, the instruction input from the operator through the touch panel 19, or the like. Alternatively, such control may be performed by a processor 40 of the image processing device 14.

The image reading device 12 may adopt various forms. FIG. 1 shows an example of a device configuration of the image reading device 12. The image reading device 12 includes a platen glass 30 on which a sheet is to be placed. During detection of the deviation amount of the folding line of the sheet P, the sheet P is placed on the platen glass 30 while being folded as shown in FIG. 1.

The image reading device 12 includes a platen cover 32, an illumination unit 21, and a light receiver 22. The platen cover 32 presses the sheet P onto the platen glass 30. The illumination unit 21 emits light to the sheet P placed on the platen glass 30. The light receiver 22 is a charge coupled device (CCD) that receives reflected light from the sheet P. The illumination unit 21 is mounted on a carriage 24 that moves in a sub-scanning direction (right and left directions in FIG. 1). The illumination unit 21 scans the sheet P as the carriage 24 moves. The reflected light from the sheet P is guided to the light receiver 22 via a mirror 26 mounted on the carriage 24, fixed mirrors 27, 28, and a lens 29. The light receiver 22 converts the reflected light into an electric signal to generate image information.

The image processing device 14 includes the processor 40 and a memory 42. During detection of the deviation amount of the folding line of the sheet P, the processor 40 operates according to a program stored in the memory 42, obtains the image information on the sheet P from the image reading device 12 and temporarily stores the image information in the memory 42, then appropriately reads the image information from the memory 42 and analyzes the image information, and detects the deviation amount of the folding line of the sheet P. The memory 42 (also referred to as a storage) is, for example, a memory (for example, RAM, ROM, flash memory, and the like) including a semiconductor element, a hard disk, or the like, and stores programs, information data, and the like.

The image forming device 16 is a device that forms an image on a sheet P by an electrophotographic method, an inkjet recording method, or the like. The folding device 18 is a device that performs a folding process such as a half fold, a Z-fold (a three-panel accordion fold), and a C-fold (a tri-fold). The image forming device 16 and the folding device 18 are connected to each other through a sheet transport path. The sheet P can be transported from the image forming device 16 to the folding device 18 with an image formed on the sheet P by the image forming device 16 or with no image formed on the sheet P, and a folding process can be performed on the sheet P.

Next, a process of detecting the deviation amount of the folding line of the sheet P will be described in detail. Here, the term "deviation amount of the folding line" refers to information indicating a direction of deviation of the folding line from an intended position and a magnitude of the deviation. There are a first exemplary embodiment and a second exemplary embodiment in the process of detecting the deviation amount of the folding line. First, the first exemplary embodiment will be described.

First Exemplary Embodiment

Figure 2:
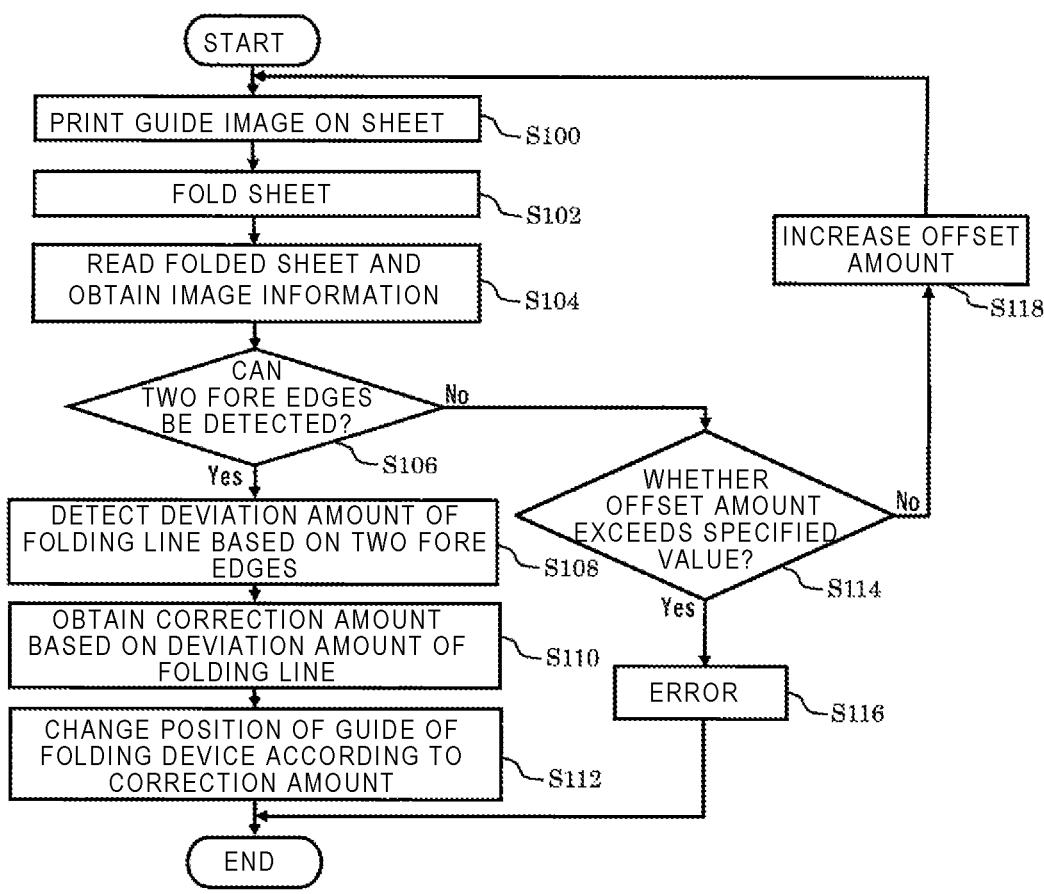
FIG. 2 is a flow chart of a process of detecting a deviation amount of a folding line according to a first exemplary embodiment.

FIG. 2 is a flow chart of the process of detecting a deviation amount of a folding line and a process of adjusting the folding device 18 based on the detected deviation amount according to the first exemplary embodiment. The flow chart of FIG. 2 is started when an operator operates the touch panel 19 and issues an instruction to start an adjustment of the folding device 18 (which may be referred to as an adjustment start instruction).

First, S100 and S102 of FIG. 2 are steps of creating a test sheet P (also simply referred to as sheet P) for detecting the deviation amount of the folding line. When the adjustment start instruction is issued via the touch panel 19, the system controller 11 receives the adjustment start instruction, and issues commands to cause the image forming device 16 to form a guide image on the sheet P (S100), and then cause the folding device 18 to fold the sheet P (S102).

Figure 3:
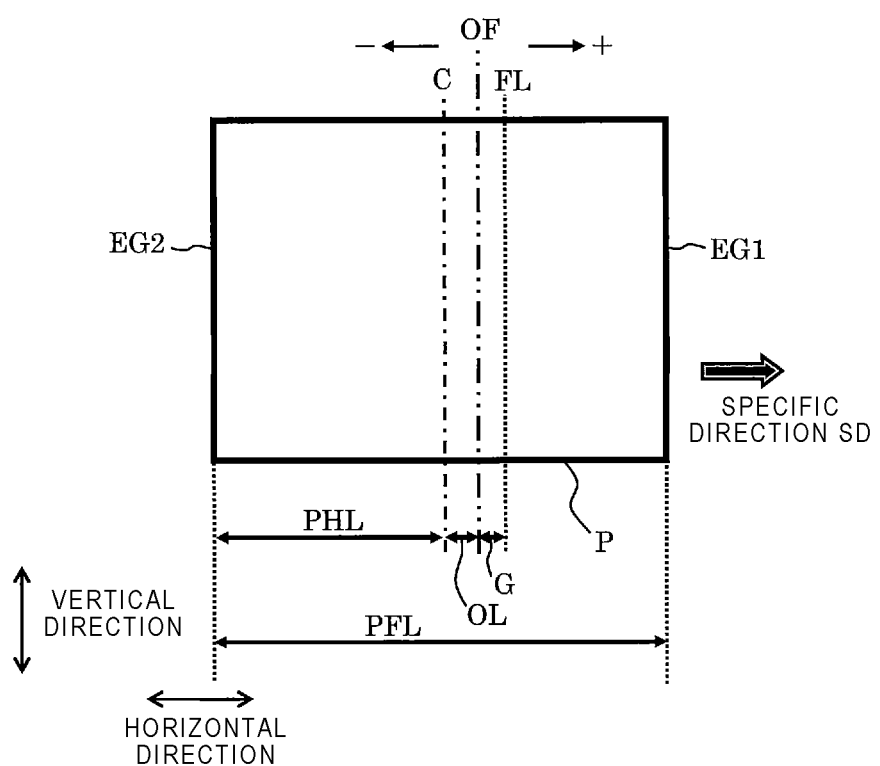
FIG. 3 is a diagram showing a test sheet.
Figure 4:
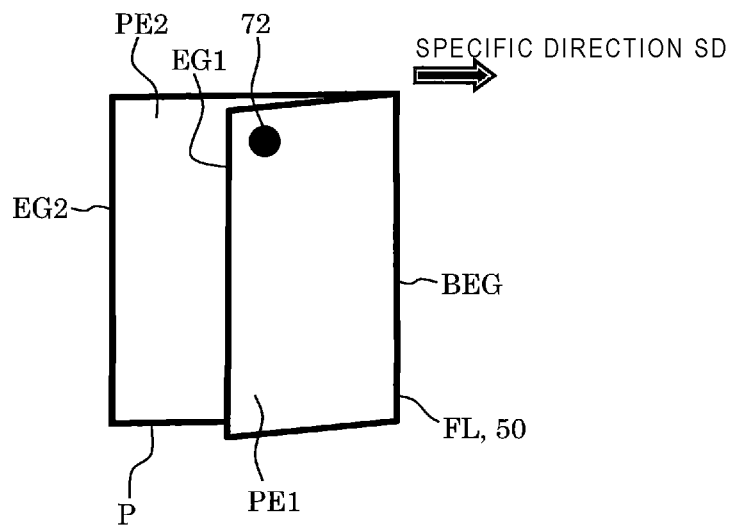
FIG. 4 is a diagram showing an example of a folded test sheet.

FIG. 3 shows the test sheet P before being folded, and FIG. 4 shows the test sheet P after being folded. Upon receipt of the command from the system controller 11, the image forming device 16 feeds the sheet P from a sheet feeding tray (not shown), and forms a guide image 72 (see FIG. 4) on the sheet P (S100). The guide image 72 is information indicating a sheet surface that is to face the platen glass 30 serving as a sensor surface of the image reading device 12 when the sheet P is read by the image reading device 12 in S104 which will be described later. In FIG. 4, as an example of the guide image 72, a circle filled with black is drawn on a corner of the sheet. It is noted that a form of the guide image 72 is not limited to the circle filled with black. A position of the guide image 72 may be appropriately changed. Various marks, symbols, characters, sentences, pictures, or the like may be adopted as the guide image 72.

The sheet P on which the guide image 72 is formed is transported to the folding device 18 through the sheet transport path. The folding device 18 folds the transported sheet P (S102), and then discharges the folded sheet P to an external sheet discharge tray (not shown).

Here, a position on the sheet P that the folding device 18 folds will be described. As shown in FIG. 3, a direction along an upper side and a lower side of the sheet P is defined as a horizontal direction, and a direction perpendicular to the horizontal direction is defined as a vertical direction. The folding device 18 folds the sheet P such that a folding line FL is formed along the vertical direction of the sheet P. The process of detecting a deviation amount of the folding line FL is to detect a deviation amount G of the folding line FL in the lateral direction of the sheet. The folding device 18 folds the sheet P such that the folding line FL is formed at a position OF that is apart from a sheet center position C in a specific direction SD (right direction in FIG. 3) by a predetermined distance OL. The sheet center position C is a center position of the sheet P in the lateral direction. However, the position of the folding line may be deviated from the intended position OF. FIG. 3 shows an example in which the folding line FL is formed at a position deviated from the intended position OF in the specific direction SD by G. In the following description, the predetermined distance OL is also referred to as an offset amount OL, and the position OF is also referred to as an offset position OF. FIG. 3 shows a sheet size PFL that is a full length of the sheet P in the lateral direction before being folded, and a length PHL that is half of the sheet size PFL. The offset amount OL and the sheet size PFL are stored in advance in the memory of the system controller 11, the memory 42 of the image processing device 14, or the like.

In the present specification, two sides of the folded sheet P (see FIG. 4) that are opposite to each other across a folding back 50 are defined as fore edges EG1 and EG2 (also simply referred to as edges EG1 and EG2), respectively. The fore edge EG1 is a side of a short folded piece PE1, and the fore edge EG2 is a side of a long folded piece PE2. A side of the sheet P that the folding back 50 of the folded sheet P constitutes is defined as a folding back edge BEG.

When discharging the folded sheet P, the folding device 18 notifies the system controller 11 of completion of the discharge via the bus 20. Upon receipt of the notification from the folding device 18, the system controller 11 displays on the touch panel 19 that creation of the test sheet P is completed. Accordingly, the creation of the test sheet P is completed.

The system controller 11 also displays a guide screen on the touch panel 19. The guide screen is a screen requesting the operator to input an adjustment continuation instruction through the touch panel 19 when he or she places the discharged and folded sheet P on the platen glass 30 of the image reading device 12 with the sheet P being folded and the sheet P is ready to be read.

According to the guide screen of the touch panel 19, the operator places the discharged and folded sheet P on the platen glass 30 of the image reading device 12 while the sheet P is being folded as shown in FIG. 1. At this time, the operator places the sheet P on the platen glass 30 using the guide image 72 (see FIG. 4) of the sheet P as a mark. Specifically, the operator places the sheet P on the platen glass 30 such that the sheet surface on which the guide image 72 is formed faces the platen glass 30. Accordingly, the short folded piece PE1 of the sheet P is brought into a state in which the short folded piece PE1 of the sheet P faces the platen glass 30.

It is assumed that the platen glass 30 is on a back side of the sheet P shown in FIG. 4. In this case, when the operator places the sheet P on the platen glass 30 with turning the sheet P over such that the top and bottom of the sheet P are interchanged (the guide image 72 is on the lower side), the fore edge EG2 of the sheet P appears on a left side in image information 60 obtained by reading the sheet P (see FIG. 5). On the other hand, when the operator places the sheet P on the platen glass 30 with turning the sheet P over such that the right and left sides of the sheet P are interchanged (the guide image 72 remains on the upper side), the fore edge EG2 of the sheet P appears on a right side in the image information 60. As described above, where the fore edge EG2 appears in the image information 60 changes depending on how the operator turns the sheet P over. In the first exemplary embodiment, the processor 40 of the image processing device 14 cannot correctly detect the deviation amount G of the folding line FL unless it is determined in advance in the image information 60 whether the fore edge EG2 is on the left side or right side. Therefore, it is necessary to guide the operator to place the sheet P in a predetermined manner. Details of how to place the sheet P may be displayed on the touch panel 19 to guide the operator. Alternatively, or together therewith, the details of how to place the sheet P may be printed on the sheet P by the image forming device 16.

After placing the sheet P on the platen glass 30, the operator covers the sheet P as shown in FIG. 1 with the platen cover 32 from above and operates the touch panel 19 to issue the adjustment continuation instruction. Upon receipt of the adjustment continuation instruction from the operator through the touch panel 19, the system controller 11 issues a command to the image reading device 12 to cause the image reading device 12 to obtain the image information. Upon receipt of the command from the system controller 11, the image reading device 12 scans the sheet P by moving the carriage 24 in the sub-scanning direction, and obtains the image information on the sheet P (S104 in FIG. 2). After obtaining the image information, the image reading device 12 notifies the system controller 11 of completion of the obtaining via the bus 20. Upon receiving the notification, the system controller 11 issues a command to the image processing device 14 to cause the image processing device 14 to detect the deviation amount of the folding line of the sheet based on the image information.

Upon receipt of the command from the system controller 11, the processor 40 of the image processing device 14 obtains the image information from the image reading device 12, and stores the image information in the memory 42. Then, the processor 40 reads the image information from the memory 42, analyzes the image information, and detects the deviation amount of the folding line FL of the sheet P. Hereinafter, a specific detection process performed by the processor 40 will be described.

Figure 5:
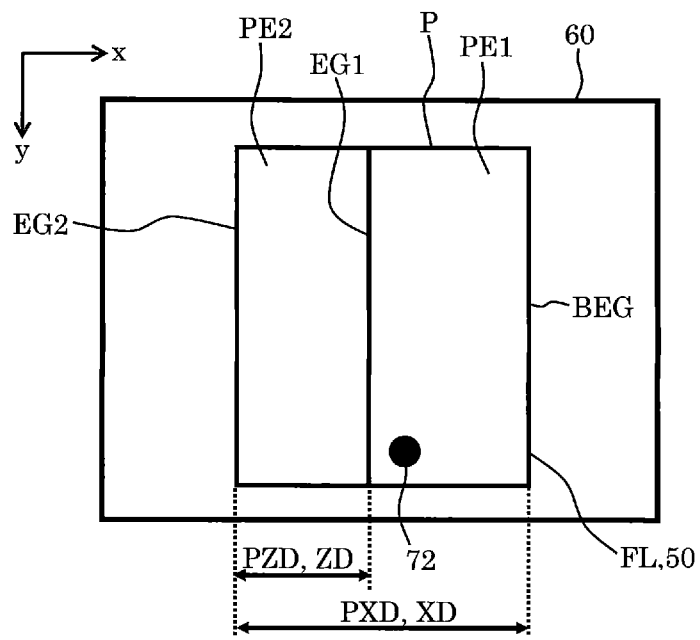
FIG. 5 is a diagram showing an example of image information.

First, in S106, the processor 40 detects the fore edges EG1 and EG2 in the image information 60. FIG. 5 is a diagram showing the image information 60 which is obtained by reading the sheet P with the image reading device 12 when the operator places the sheet P on the platen glass 30 by turning the sheet P over such that the top and bottom of the sheet P shown in FIG. 4 is interchanged in a case where the platen glass 30 is on the back side of the sheet P shown in FIG. 4. The image information 60 is information including a large number of pixels arranged vertically and horizontally. A position of each pixel is specified by xy coordinates. Coordinates of a pixel at an upper left corner are (x, y)=(0, 0). Since the sheet P is read in a state where the sheet P is placed away from the edge of the platen glass 30, a contour line (EG2, BEG, and the like) of the folded sheet P appears in the image information 60. In the first exemplary embodiment, the deviation amount G of the folding line FL is detected based on a distance PZD between the two fore edges EG1 and EG2 of the sheet P in the image information 60.

The processor 40 searches the image information 60 and detects, among the fore edges EG1 and EG2 and the folding back edge BEG extending in a y direction of the image information 60 or a direction similar to the y direction, the leftmost edge as the fore edge EG2 and the second edge from the left side as the fore edge EG1. Then, when the fore edges EG1 and EG2 are detected (S106 in FIG. 2: Yes), the processor 40 proceeds to S108.

Next, in S108, the processor 40 first obtains the distance PZD between the fore edges EG1 and EG2 based on positions of the fore edges EG1 and EG2. The processor 40, for example, obtains xy coordinates of a center of the fore edge EG1 in an extending direction of the fore edge EG1 as first coordinates, and obtains a position where a virtual line extending in a direction perpendicular to the extending direction of the fore edge EG1 intersects the fore edge EG2 as second coordinates. Then, the processor 40 obtains a distance between the first coordinates and the second coordinates as PZD. Here, the distance PZD is represented by the number of pixels. An actual size (actual physical length) per pixel can be obtained in advance based on a reading resolution of the image reading device 12 and the like. The processor 40 obtains an actual physical length ZD between the fore edges EG1 and EG2 of the sheet P by multiplying the distance PZD by the actual size per pixel. Then, the processor 40 calculates the deviation amount G of the folding line FL by the following Equation (1). The processor stores the calculated deviation amount G in the memory 42.

$$G = ZD/2 - OL \quad (1)$$

In the above Equation (1), OL is the offset amount OL (predetermined distance) shown in FIG. 3, and G is the deviation amount G of the folding line FL from the offset position OF shown in FIG. 3. In the above Equation (1), when ZD/2 is larger than OL (ZD/2>OL), in other words, when ZD is larger than twice of OL (ZD>2OL), G is a positive value. At this time, as shown in FIG. 3, it means that the folding line FL is deviated from the intended position OF in the specific direction SD.

In the above Equation (1), when ZD/2 is smaller than OL (ZD/2<OL), in other words, when ZD is smaller than twice of OL (ZD<2OL), G is a negative value. At this time, it means that the folding line FL is deviated from the intended position OF in a direction opposite to the specific direction SD.

In the above Equation (1), when ZD/2 and OL are the same (ZD/2=OL), in other words, when ZD is twice of OL (ZD=2OL), G is 0. At this time, the folding line FL is positioned at the intended position OF, which means that the folding line FL is not deviated. Therefore, the processor 40 knows whether the folding line FL is deviated based on whether G is 0, and knows in which direction the folding line FL is deviated based on whether G is positive or negative.

The process of detecting the deviation amount G of the folding line FL according to the first exemplary embodiment is described above. Next, in S110, the processor 40 obtains a correction amount CR for the folding device 18 based on the deviation amount G of the folding line FL. The processor 40 obtains a value as the correction amount CR by reversing the positive and negative of the deviation amount G. Similarly to the deviation amount G, a positive or negative sign of the correction amount CR represents a direction in which the folding line FL is to be corrected, and an absolute value of the correction amount CR represents an amount by which the folding line FL is to be corrected. For example, when the deviation amount G is +α (G=+α), the folding line FL coincides with the intended position OF if the folding line FL is corrected by α in the direction opposite to the specific direction. Therefore, the processor 40 obtains the correction amount CR=−α, which is a value obtained by reversing the sign of the deviation amount G. Similarly, for example, when the deviation amount G is −α (G=−α), the folding line FL coincides with the intended position OF if the folding line FL is corrected by α in the specific direction. Therefore, the processor 40 obtains the correction amount CR=+α, which is a value obtained by reversing the sign of the deviation amount G. The processor stores the obtained correction amount CR in the memory 42.

When completing the process in S110, the image processing device 14 notifies the system controller 11 of completion of the processing via the bus 20. Upon receipt of the notification, the system controller 11 issues a command to the folding device 18 to cause the folding device 18 to correct the deviation amount of the folding line FL.

Upon receipt of the command from the system controller 11, the folding device 18 obtains the correction amount CR stored in the memory 42 of the image processing device 14, and corrects a position of a guide based on the correction amount CR (S112). The guide determines a folding position of the sheet. The folding device 18 can apply the correction amount CR to each folding position when various folding processes such as half-fold, Z-fold, C-fold, and four-panel accordion fold are performed.

When completing the correction, the folding device 18 notifies the system controller 11 of completion of the correction via the bus 20. Then, upon receipt of the notification, the system controller 11 displays on the touch panel 19 that adjustment of the folding device 18 is completed. Accordingly, the operator can know that the adjustment of the folding device 18 is completed.

When the fore edges EG1 and EG2 cannot be detected (S106: No), the processor 40 of the image processing device 14 proceeds to S114. This is a case where the fore edges EG1 and EG2 cannot be detected because the sheet P is thin paper or the like, or is a case where since the offset amount OL is small, the fore edges EG1 and EG2 are superimposed on the image information 60, and the fore edges EG1 and EG2 cannot be detected individually. In S114, the processor 40 checks whether the offset amount OL exceeds a specified value. The specified value is a predetermined maximum value of the offset amount OL. The specified value is stored in advance in the memory of the system controller 11, the memory 42 of the image processing device 14, or the like. If a determination result of S114 is No, the image processing device 14 notifies the system controller 11 via the bus 20 that a test sheet P having an increased offset amount OL is required. Upon receipt of the notification, the system controller 11 increases the offset amount OL stored in the memory by a predetermined amount, and updates the offset amount OL in S118. The system controller 11 also displays on the touch panel 19 that the test sheet P needs to be created again. In response to such displayed information, the operator operates the touch panel 19 to issue the adjustment start instruction again. Accordingly, the process is started again from S100, the test sheet P having the offset amount OL increased from that of a previous time is created, and the test sheet P is read with the image reading device 12. On the new test sheet P, the offset amount OL increases and the distance between the fore edges EG1 and EG2 increases, so that the fore edges EG1 and EG2 are more likely to appear individually in the image information 60, and possibility that the fore edges EG1 and EG2 can be detected is enhanced as compared with the previous time.

On the other hand, if the offset amount OL exceeds the specified value in S114 (S114: Yes), the image processing device 14 notifies the system controller 11 via the bus 20 that the deviation amount of the folding line cannot be detected. This is a case where the fore edges EG1 and EG2 cannot be detected because the sheet P is thin paper or the like. Upon receipt of the notification, the system controller 11 displays an error on the touch panel 19 (S116), and ends the process.

According to the first exemplary embodiment described above, the sheet P is folded with an intention that the folding line FL is formed at the position OF which is apart from the sheet center position C in the specific direction SD by the predetermined distance OL, and thus even when the deviation amount G of the folding line FL of the sheet P is small, the fore edges EG1 and EG2 of the sheet P are positioned apart from each other. Since the sheet P is read by the image reading device 12, the fore edges EG1 and EG2 individually appear in the image information 60 obtained by reading the sheet P. Therefore, the deviation amount G of the folding line FL can be detected based (i) on the positions of the fore edges EG1 and EG2 in the image information 60 and (ii) the predetermined distance OL. That is, even when the deviation amount G of the folding line FL is small, the deviation amount G of the folding line FL can be detected. The position of the guide of the folding device 18 is corrected based on the correction amount CR corresponding to the deviation amount G of the folding line FL. Therefore, when another sheet is folded by the folding device 18 after the correction, it can be expected that a folding line FL of the another sheet is formed at the intended position or a position close to the intended position.

Second Exemplary Embodiment

Next, a process of detecting a deviation amount of a folding line according to the second exemplary embodiment will be described. In the second exemplary embodiment, the deviation amount G of the folding line FL is detected based on a length XD (see FIG. 5) of a sheet side in a direction intersecting the folding line FL of the folded sheet P. In the second exemplary embodiment, the positions of the fore edge EG2 of the long folded piece PE2 and the folding back edge BEG are detected in the image information 60. Since the second exemplary embodiment has many points in common with the first exemplary embodiment, points different from the first exemplary embodiment will be particularly described.

Figure 6:
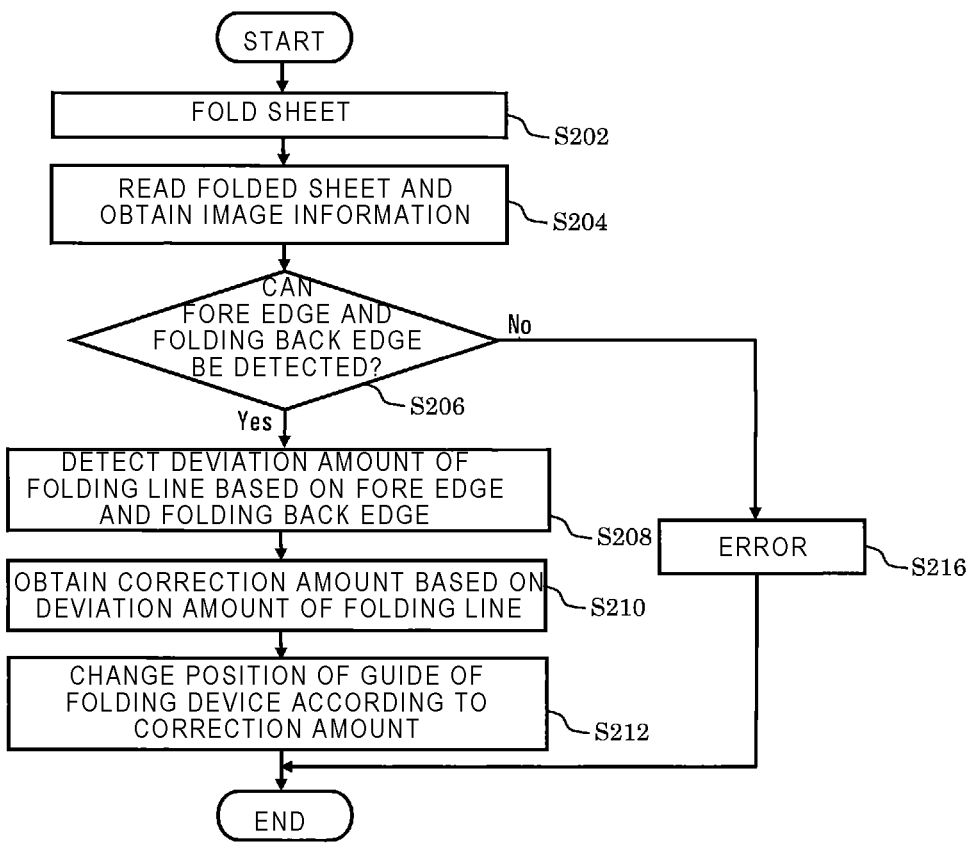
FIG. 6 is a flow chart of a process of detecting a deviation amount of a folding line according to a second exemplary embodiment.

FIG. 6 is a flow chart of the process of detecting the deviation amount of the folding line and the process of adjusting the folding device 18 based on the detected deviation amount according to the second exemplary embodiment. First, in S202, the test sheet P is created. This process is similar to that in the first exemplary embodiment. However, in the second exemplary embodiment, printing of the guide image 72 on the sheet P can be omitted. This is because, in the second exemplary embodiment, the operator does not need to be aware of an orientation in which the sheet P is to be placed on the platen glass 30. In the second exemplary embodiment, the fore edge EG1 of the short folded piece PE1 of the sheet P is not detected in the image information 60. Therefore, there is no need to place the sheet P such that the short folded piece PE1 faces the platen glass 30 as shown in FIG. 1. Also, when the sheet P shown in FIG. 4 is to be placed on the platen glass 30, which one of EG2 and BEG is located on the right part in the image information 60 depends on whether the sheet P is turned over such that the top and bottom of the sheet P are interchanged or the right and left sides of the sheet P are interchanged. In the second exemplary embodiment, a distance PXD between the EG2 and BEG positioned at both ends of the folded sheet P may only have to be obtained. Therefore, the deviation amount G of the folding line FL can be correctly detected even when the positions of the EG2 and BEG are interchanged in the lateral direction. Therefore, in the second exemplary embodiment, the operator does not need to be aware of the orientation in which the sheet P is to be placed, and the guide image 72 can be omitted. It is noted that this does not mean that the guide image 72 is positively removed. The guide image 72 may be formed on the sheet P.

Similarly to the first exemplary embodiment, the test sheet P is created by folding the sheet P in S202 of FIG. 6. Similarly to the first exemplary embodiment, the folded sheet P is read by the image reading device 12, and the image information 60 of the sheet P is obtained in S204. Then, the processor 40 analyzes the image information 60 and detects the deviation amount of the folding line FL of the sheet P. Hereinafter, a specific detection process performed by the processor 40 according to the second exemplary embodiment will be described.

First, in S206, the processor 40 detects the fore edge EG2 of the long folded piece PE2 and the folding back edge BEG in the image information 60. The processor 40 searches the image information 60 shown in FIG. 5 and detects, among the fore edges EG1 and EG2 and the folding back edge BEG extending in the y direction of the image information 60 or a direction similar to the y direction, the leftmost (or rightmost) edge as the fore edge EG2 and the rightmost (or leftmost) edge as the folding back edge BEG. When the fore edge EG2 and the folding back edge BEG are detected (S206 in FIG. 2: Yes), the processor 40 proceeds to S208.

Next, in S208, the processor 40 obtains the distance PXD between the fore edge EG2 and the folding back edge BEG based on the positions of the fore edge EG2 and the folding back edge BEG. The processor 40, for example, obtains xy coordinates of a center of the fore edge EG2 in an extending direction of the fore edge EG2 as first coordinates, and obtains a position where a virtual line extending in a direction perpendicular to the extending direction of the fore edge EG2 intersects the folding back edge BEG as second coordinates. Then, the processor 40 obtains a distance between the first coordinates and the second coordinates as PXD. The processor 40 also calculates the actual physical length XD between the fore edge EG2 and the folding back edge BEG of the sheet P by multiplying the distance PXD by the actual size per pixel. The XD is a length of a sheet side in the direction intersecting the folding line FL of the folded sheet P. Then, the processor 40 calculates the deviation amount G of the folding line FL by the following Equation (2). The processor stores the calculated deviation amount G in the memory 42.

$$G=XD-(PFL/2+OL) \qquad (2)$$

In the above Equation (2), OL is the offset amount OL (predetermined distance) shown in FIG. 3, PFL is the sheet size PFL of the sheet P in the direction intersecting the folding line FL shown in FIG. 3 before the sheet P is folded, and G is the deviation amount G of the folding line FL from the offset position OF shown in FIG. 3. In the above Equation (2), when XD is larger than (PFL/2+OL) (that is, XD>(PFL/2+OL)), G is a positive value. At this time, as shown in FIG. 3, it means that the folding line FL is deviated from the intended position OF in the specific direction SD.

In the above Equation (2), when XD is smaller than (PFL/2+OL) (that is, XD<(PFL/2+OL)), G is a negative value. At this time, it means that the folding line FL is deviated from the intended position OF in a direction opposite to the specific direction SD.

In the above Equation (2), when XD and (PFL/2+OL) are the same (that is, XD=(PFL/2+OL)), G is 0. At this time, the folding line FL is positioned at the intended position OF, which means that the folding line FL is not deviated. Therefore, the processor 40 knows whether the folding line FL is deviated based on whether G is 0, and knows in which direction the folding line FL is deviated based on whether G is positive or negative.

The process of detecting the deviation amount G of the folding line FL of the second exemplary embodiment has been described above. Next, in S210, the processor 40 obtains the correction amount CR of the folding device 18 based on the deviation amount G of the folding line FL. Then, in S212, the folding device 18 obtains the correction amount CR and corrects the position of the guide, which determines the folding position of the sheet, based on the correction amount CR. The above steps is similar to those in the first exemplary embodiment.

When the fore edge EG2 and the folding back edge BEG cannot be detected (S206 in FIG. 2: No), the image processing device 14 notifies the system controller 11 via the bus 20 that the deviation amount of the folding line cannot be detected. This is a case where the fore edge EG2 or the folding back edge BEG cannot be detected because the sheet P is a thin paper or the like. Upon receipt of this notification, the system controller 11 displays an error on the touch panel 19 (S216), and ends the process.

According to the second exemplary embodiment described above, similarly to the first exemplary embodiment, even when the deviation amount G of the folding line FL is small, the deviation amount G of the folding line FL can be detected. When the folded sheet P is read by the image reading device 12, the short folded piece PE1 does not need to face the sensor surface. Therefore, the operator does not need to be aware of the orientation in which the sheet P is placed on the sensor surface, and work of the operator can be simplified.

In the first and second exemplary embodiments described above, the folding device 18 is automatically corrected. Alternatively, the deviation amount G of the folding line FL of the sheet P may be displayed on the touch panel 19, but the folding device 18 may not be corrected. Even in this case, the operator can know in which direction and to what extent the folding line is to be corrected in order to eliminate the deviation of the folding line. The direction in which the folding line FL of the sheet P is deviated may be simply displayed on the touch panel 19. Even in this case, the operator can know in which direction the folding line is to be corrected in order to eliminate the deviation of the folding line.

In the first and second exemplary embodiments described above, the sheet P is placed on the platen glass 30 of the image reading device 12, and the image information 60 is obtained by reading the sheet P. Alternatively, after the sheet P is folded by the folding device 18 and before the folded sheet P is discharged to the outside of the folding device 18, the image information 60 may be obtained by reading the transported sheet P using an image reading device inside the folding device 18. In this case, the folding device 18 is configured such that a sensor surface faces the transport path for the folded sheet P, so that the sheet P is read. At this time, when the detection process of the first exemplary embodiment is applied, the sheet P may be transported such that the short folded piece PE1 of the folded sheet P faces the sensor surface.

Furthermore, inside the folding device 18, the folded sheet P may be transported in the direction intersecting the folding line FL, the folding back edge BEG and the fore edges EG1 and EG2 of the transported sheet P may be detected using (i) a light reflective sensor that emits light toward the sheet P and receives reflected light from the sheet P or (ii) a light transmissive sensor that includes a light emitter and a light receiver facing each other across a sheet transport path, and the distance ZD between the EG1 and the EG2 or the distance XD between the BEG and the EG2 may be obtained based on (i) differences among detection times of BEG, EG1, and EG2 and (ii) a transport speed of the sheet P.

In the first and second exemplary embodiments described above, the image processing device 14 and the touch panel 19 are provided outside the folding device 18. Alternatively, the image processing device 14 and the touch panel 19 may be provided in the folding device 18.

In the exemplary embodiments above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing device comprising:
a processor configured to:
obtain image information obtained by reading a sheet that is folded with an intention that a folding line is formed at a position apart from a sheet center position in a specific direction by a predetermined distance, using an image reading device in a state in which a short folded piece of the sheet faces a sensor surface;
obtain positions of two edges that are opposite to each other across a folding back of the sheet in the image information; and
detect a deviation amount of the folding line based on the positions of the two edges and the predetermined distance.

2. The image processing device according to claim 1, wherein information indicating a sheet surface that is to face the sensor surface of the image reading device is printed on the sheet.

3. The image processing device according to claim 1, wherein when a distance between the two edges is larger than twice of the predetermined distance, the processor detects that the folding line is deviated from an intended position in the specific direction.

4. The image processing device according to claim 1, wherein when a distance between the two edges is smaller than twice of the predetermined distance, the processor detects that the folding line is deviated from an intended position in a direction opposite to the specific direction.

5. A folding device configured to form a folding line on another sheet based on the deviation amount of the folding line detected by the image processing device according to claim 1 such that deviation of the folding line on the another sheet is eliminated when the another paper is folded.

6. An image processing device comprising:
a processor configured to:
obtain image information obtained by reading a sheet that is folded with an intention that a folding line is formed at a position apart from a sheet center position in a specific direction by a predetermined distance, using an image reading device in a state in which the sheet is folded;
obtain a length of a sheet side in a direction intersecting the folding line of the sheet in the image information; and
detect a deviation amount of the folding line based on (i) the length of the sheet side, (ii) a sheet size of the sheet in the direction intersecting the folding line of the sheet before the sheet is folded, and (iii) the predetermined distance.

7. The image processing device according to claim 6, wherein when the length of the sheet side is larger than a length obtained by adding the predetermined distance to ½ of the sheet size, the processor detects that the folding line is deviated from an intended position in the specific direction.

8. The image processing device according to claim 6, wherein when the length of the sheet side is smaller than a length obtained by adding the predetermined distance to ½ of the sheet size, the processor detects that the folding line is deviated from an intended position in a direction opposite to the specific direction.

9. An image processing device comprising:
   means for
      obtaining image information obtained by reading a sheet that is folded with an intention that a folding line is formed at a position apart from a sheet center position in a specific direction by a predetermined distance, using an image reading device in a state in which a short folded piece of the sheet faces a sensor surface;
      obtaining positions of two edges that are opposite to each other across a folding back of the sheet in the image information; and
      detecting a deviation amount of the folding line based on the positions of the two edges and the predetermined distance.

\* \* \* \* \*